United States Patent Office 3,549,387
Patented Dec. 22, 1970

3,549,387
PROCESS FOR PREPARING AN AERATED SHORTENING COMPOSITION
Alan James Howard, Newcastle-upon-Tyne, England, assignor to The Procter & Gamble Company, Cincinnati, Ohio, a corporation of Ohio
No Drawing. Filed Apr. 30, 1968, Ser. No. 725,538
Claims priority, application Great Britain, May 16, 1967, 22,698/67
Int. Cl. A23d 5/02
U.S. Cl. 99—122                8 Claims

ABSTRACT OF THE DISCLOSURE

Process for preparing aerated plastic shortening which comprises: rapidly chilling liquid fat; passing the chilled fat through two crystallizing zones; and then injecting edible gas into the fat.

BACKGROUND OF THE INVENTION

The field of this invention is edible fat processing. The invention itself relates to a process for producing aerated plastic shortening compositions.

Plastic shortening compositions are commonly aerated with an innocuous gas such as nitrogen or air. The principal purpose of aerating plastic shortenings is to improve the appearance of the shortening. Non-aerated plastic shortenings tend to be yellowish, translucent materials which are unattractive to the consumer. By incorporating an aerating gas uniformly into the shortening in the form of uniformly dispersed very small bubbles, a white opaque product of pleasing appearance is obtained. Additionally, aeration can lead to a softer product with an extended plastic range (i.e. the temperature range over which the product deforms easily without being fluid).

Conventional methods for producing plastic shortenings involve the steps of heating the shortening to a temperature above the melting point of its solid components to form a melt or liquid fat, rapidly chilling the liquid fat in a scraped surface heat exchanger such as a unit commonly referred to as a "Votator" to produce a cloud of minute crystal nuclei, passing through a crystallizing unit where crystallization is allowed to continue with mild agitation, and storage at constant temperature in a final crystallization step known as tempering. The aerating gas is injected into the fat prior to the chilling process and the fat is maintained under high pressure during the chilling and subsequent crystallization stage so that the injected gas is maintained in solution during these processes. After leaving the crystallizing unit the fat is passed through a suitable throttle valve where the pressure is released and the dissolved gas comes out of solution and is dispersed as minute bubbles. The fat is then packed in suitable packages and maintained in a constant temperature room at about 80°–90° F. for 24 to 72 hours ("tempering") to enable the final equilibrium of the stable crystalline phase to be established. Such a process is described by A. E. Bailey, "Industrial Oil and Fat Products," Interscience Publishers, New York, 1951, pages 923–924.

The amount of gas which can be incorporated into plastic shortening by the conventional process described above is limited by the solubility of the gas in the fat. Undissolved gas present in the fat during the chilling step can interfere with the efficiency of the chilling process and tend to reduce the capacity of the equipment. Although up to about 22 vol. percent of gas can be incorporated in shortening by the conventional process, high levels of gas (e.g., 15%–22%) can give a coarse dispersion or a streaked product.

SUMMARY OF THE INVENTION

It has now been found that gas can be successfully introduced into plastic shortening after tempering, i.e., when equilibrium of the stable crystalline phase is substantially established.

More specifically, the present invention provides a process for producing aerated plastic shortening, which comprises: rapidly chilling liquid fat, i.e., a plastic shortening composition in the completely liquid condition, to a temperature of less than about 80° F. in a time less than about one minute; mildly agitating the chilled fat in a first crystallizing zone where the fat is allowed to crystallize without heat transfer for a period of from about 30 seconds to about 10 minutes to cause the temperature of the fat to rise; holding the fat in a second crystallizing zone (at rest or under mild agitation) for a period of at least about 12 hours while maintaining the temperature substantially constant at the temperature to which the fat rises during crystallization; and then injecting an innocuous gas into the fat.

In the above process, the aerated plastic shortening can contain from about 5% to about 50% by volume of the gas. Thus, more than the conventional proportions of gas can be included and it has also surprisingly been found that plastic shortening which is aerated after tempering in accordance with the process of this invention has improved creaming properties compared with the same shortening aerated with the same proportion of gas when the air is injected before the chilling step as in conventional practice.

DESCRIPTION OF THE PREFERRED EMBODIMENTS

The term "plastic" shortening defines a solid, non-fluid, non-pourable shortening at room temperature (70° F.–100° F.). Plastic shortening must have a yield point high enough to prevent product flow at room temperature; that is, it must be sufficiently solid to prevent product deformation under its own weight in ordinary commercial unit quantities and preferably also must be non-pumpable with ordinary commercial pumps which are conventionally used for pumping liquids or fluids at room temperature.

The fats which can be used for preparing plastic shortening by the process of this invention can be any of the usual shortening stocks employed in preparing aerated plastic shortenings. Various fats such as cottonseed oil, soybean oil, lard, palm oil, and other vegetable and animal fats or mixtures thereof, either unhydrogenated or in various stages of hydrogenation, can be used so long as the material is solid or plastic at room temperature.

Preferably, the shortening processed by this invention comprises a fatty glyceride derived from animal, vegetable or marine fats and oils, or a similar fatty glyceride synthetically produced. These glycerides can contain saturated or unsaturated "long-chain" acyl radicals having from about 12 to about 22 carbon atoms such as lauroyl, lauroleoyl, myristoyl, myristoleoyl, palmitoyl, palmitoleoyl, stearoyl, oleoyl, linoleoyl, linolenoyl, arachiodoyl, arachidonoyl, behenoyl, erucoyl, and the like, and are generally obtained from edible triglyceride fats and oils such as cottonseed, soybean, coconut, rapeseed, peanut, olive, palm, palm kernel, corn, sunflower, safflower, sesame seed, rice bran, wallflower, nasturtium seed, mustard seed, whale, sardine, herring, menhaden, and pilchard oils as well as from lard, tallow and the like.

Also suitable as part of the glycerides of the shortening are certain di- or triglycerides in which one or two of the hydroxyl groups of the glycerine have been esterified with "short-chain" fatty acids having from 2 to about 6 carbon atoms such as acetic, propionic, butyric, valeric, and caproic acids, and one or two of the remaining hydroxyl groups have been esterified with higher molecular weight fatty acids having from about 12 to about 22 carbon atoms.

The shortening prepared by this invention also can contain glycerides prepared by random or by low-temperature directed rearrangement or interesterification reactions of fatty triglyceride-containing fats and oils, such as interesterified or rearranged cottonseed oil and lard; the glycerides also can be obtained by esterification reactions of synthetic or natural glycerine with higher molecular weight fatty acids having from about 12 to about 22 carbon atoms.

Preferably, the shortening composition used for the process of this invention has a solids content index (S.C.I.) in the range 15–35 at 50° F. and 5–15 at 92° F.

For the purpose of this invention the solids content index is measured by the method described in the Journal of the American Oil Chemists' Society, March 1954, volume XXXI, pages 98–103, with slight modifications to enable the test to be carried out in shorter time, while still giving a very useful result which does not differ greatly from that given by the published method. The modifications are:

(1) The fat is held at 80° F. for 30 minutes, instead of until all volume changes at 80° F. have ceased, and (2) The fat is held for 30 minutes at the temperature at which the S.C.I. is determined, instead of until all volume changes have ceased.

The shortening composition can also contain any of the emulsifying agents which are well known in the art, particularly in so-called "high ratio" shortenings which are used in baking cakes in which the weight proportion of sugar is greater than the weight proportion of flour. Examples of such emulsifying agents are mono- and diglycerides of fatty acids; partial fatty acid esters of other polyhydric alcohols such as propylene glycol or hexitols (e.g. sorbitol); lactic acid esters of monoglycerides of fatty acids; polyglycerol esters, and polyoxyethylene esters. Other shortening additives such as methyl silicone can also be added.

The temperature of the shortening composition at the start of the chilling step is not critical and need only be sufficient to insure that the normally solid components of the shortening composition are in the melted or liquid state. Generally, a temperature of from about 115° F. to about 200° F. is suitable, with a temperature of from about 120° F. to about 160° F. being preferable.

The fat must be chilled from the completely melted condition to a temperature less than about 80° F. in a time less than about one minute. This rapid chilling can conveniently be carried out in a scraped wall heat exchanger such as is commonly used in chilling fat compositions.

Preferably, the chilling step is performed in a scraped wall heat exchanger apparatus commonly referred to as a freezer or a Votator. A Votator consists of one or more thin-walled nickel tubes surrounded by a cooling medium such as evaporating liquid ammonia. The tubes, commonly known as the A unit of the Votator, are provided with internal rotating blades which remove a thin film of chilled material from the tube walls. This operation is described in detail at page 922 of Bailey, supra, and the apparatus is fully disclosed by Vogt in U.S. Re. Pat. No. 21,406.

Preferably, the fat is chilled to a temperature in the range of from about 50° F. to about 70° F., preferably in less than about 30 seconds. The rapid chilling produces a cloud of minute crystal nuclei in the fat. From the rapid chilling step, the fat is mildly agitated in the first crystallizing zone where it is allowed to crystallize without heat transfer, i.e., without addition or removal of heat, for a period of from about 30 seconds to about 10 minutes, preferably from about 1 minute to about 4 minutes. The first crystallizing zone can be a tank of size such that the residence time of the fat in the tank is at least about 30 seconds. A highly preferred residence time is 1½ minutes. The mild agitation, which prevents the formation of large crystals or aggregates without breaking up individual crystals, can be provided by an axial shaft carrying a series of pegs mounted perpendicularly along the length of the shaft. The inner wall of the tank can also carry projecting pegs. A preferred apparatus for the first crystallization step is a conventional B unit of a Votator. This type of mixer has a longitudinal shaft with pins thereon. Staggered pins are also provided in the walls of the unit and rotation of the shaft during passage of the shortening provides a rake effect. The unit, which is usually operated at from about 50 to about 1200 revolutions per minute, provides mild agitation.

As a result of crystalization and work input by agitation in the first crystallizing zone without heat transfer, the temperature of the fat rises, usually by from about 5° F. to about 25° F., preferably by from about 15° F. to 20° F.

After the first crystallization step, the fat is held in a second crystallizing zone which can be a large holdtank of such capacity that the fat has a residence time of at least about 12 hours and, preferably, from about 12 to about 48 hours. The tank can, for example, be so arranged that the fat follows a circuitous path so that it remains in the tank for the required time. Alternatively a group of two or more tanks may be used in sequence whereby one tank is filled while fat is discharged from another after being held therein for a time. In either event the tanks can be jacketed and water at the required constant temperature passed through the jacket. In the second crystallizing zone the fat is allowed to remain substantially at rest, or preferably, under mild agitation to prevent the fat from setting and becoming unpumpable, until equilibrium of the stable crystalline phase is substantially established.

During residence in the second crystallizing zone, the temperature of the fat is maintained substantially constant at the temperature to which it rises as a result of crystallization. This temperature is dependent in some measure on the temperature to which the fat was chilled in the chilling stage and can readily be obtained by taking a sample of the fat leaving the first crystallizing zone and holding it in a vacuum flask until the maximum temperature is reached. The second crystallizing zone is maintained at said temperature to temper the fat. The temperature at which the fat is maintained in the second crystallization zone, i.e. the tempering step, is preferably from about 70° F. to about 90° F., most preferably from about 80° F. to about 85° F.

After the fat has remained in the second crystallizing zone for the required time it is removed and an innocuous gas (for example, filtered air) is injected into the fat, and preferably uniformly dispersed therein. The gas can be injected by conventional techniques, e.g., by feeding into the inlet of a pump. Conventional techniques can also be used to uniformly disperse the gas, e.g., by passing the aerated shortening through a throttling valve or a turbine mixer.

The gas employed in aerating the shortening in the process of this invention can be any of the usual innocuous, edible gases such as air, nitrogen, nitrous oxide, octafluorocyclobutane, or carbon dioxide. Air and nitrogen are preferred.

The amount of gas injected into the fat is adjusted so that the final product will contain the gas in an amount of from about 5% to about 50% by volume. Preferred aerated plastic shortenings prepared by the process of this invention contain the edible gas in an amount of from about 10% to about 25% by volume. After aeration, the plastic shortening can be packed in the usual containers and stored for use.

The following are examples of the process of the invention.

EXAMPLE I

A plastic shortening composition comprising a fat blend of the following formula was prepared:

|  | Percent by wt. |
|---|---|
| Hydrogenated herring oil (I.V. 86) | 52.2 |
| Hydrogenated herring oil (I.V. 73) | 24.0 |
| Hydrogenated herring oil (I.V. 50) | 11.7 |
| Refined soybean oil | 8.0 |
| Hydrogenated palm oil (I.V. 5) | 4.1 |

The S.C.I. of the above blend was 31.3 at 50° F., and 6.8 at 92° F.

The fat blend was heated to 125° F. to melt the solid constituents. The completely liquid fat blend at 125° F. was rapidly chilled to 65° F. by passing it through a scraped surface heat exchanger, the residence time in the scraped surface heat exchanger being 20 seconds. From the scraped surface heat exchanger the fat was passed to a mildly agitated crystallizing chamber (a first crystallizing zone) in which the residence time was 1½ minutes, during which time the temperature rose to 80° F. without heat transfer. The fat was then held in a water jacketed tank (second crystallizing zone) at a constant temperature of 80° F. for 48 hours in a tempering step. The tempered fat was pumped from the tank by means of a gear pump and filtered air at 10 p.s.i.g. was injected into the fat at the inlet to the pump, the air being metered at a rate corresponding to 12 volume percent of the fat. The aerated plastic shortening leaving the gear pump was passed through a throttle valve which served to disperse the air uniformly throughout the product. The product was packed and stored at 60° F. This product was designated Product I-A.

A similar product (Product I-B) was prepared from the same blend and by the same process except that 20 volume percent of air was injected, and for comparison, Product I-R, was prepared using the same fat blend and the same processing conditions except that 12 volume percent of air was injected into the fat before chilling (i.e. a conventional process) and no air was injected after tempering.

Creaming volumes of the fats were determined by mixing the fat with sugar and egg under standardization conditions and measuring the volume of 100 gm. of the mixture after 10 minutes mixing and thereafter at 5 minute intervals of mixing. The results are set out below:

|  | Volume (ml.) of 100 gm. mix | | | | |
|---|---|---|---|---|---|
| Time of mixing (minutes) | 10 | 15 | 20 | 25 | 30 |
| Product I-A (example) | | 167 | 180 | 188 | 189 |
| Product I-B (example) | 154 | 175 | 185 | 188 | 180 |
| Product I-R (comparative) | 150 | 170 | 170 | 170 | 170 |

Product I-A and Product I-R were similar in appearance, having a glossy creamy white appearance, I-A being somewhat softer than I-R. Product I-B had a whiter and more matt appearance and had softer texture than the other two products.

EXAMPLE II

A plastic shortening composition comprising a fat blend of the following formula was prepared:

| | Percent by wt. |
|---|---|
| Hydrogenate herring oil (I.V. 76) | 77.0 |
| Refined bleached tallow | 23.0 |

The S.C.I. of the above blend was 28.7 at 50° F., and 6.7 at 92° F.

This blend was processed to produce products II-A, II-B and II-R exactly as described in Example I. The creaming volume of the products were as follows.

|  | Volume (ml.) of 100 gm. mix | | | | |
|---|---|---|---|---|---|
| Time of mixing (minutes) | 10 | 15 | 20 | 25 | 30 |
| Product II-A (example) | 163 | 188 | 190 | 177 | 173 |
| Product II-B (example) | 163 | 185 | 187 | 180 | 173 |
| Product II-R (comparative) | 160 | 158 | 150 | 143 | 140 |

The products of Example II were similar in appearance to the corresponding products of Example I but were slightly softer in texture.

The above examples illustrate the improved creaming properties of aerated shortenings produced by the process of the invention over comparative shortenings produced by the conventional process. This improved creaming volume is reflected in improved volume of cakes baked using the products.

Standard cakes were baked to the following formula using the shortenings of Examples I and II and the comparative shortenings produced by the conventional process.

|  | Lbs. | Ozs. |
|---|---|---|
| Sugar | 2 | 4 |
| Fat | 1 | 12½ |
| Salt | | ¼ |
| Whole egg | 2 | 4 |
| Whole milk | | 6 |
| Flour | 3 | 0 |

The volumes of the cakes obtained using the various shortenings described above are as follows:

Shortening:    Cake vol. (cc. per lb. cake)
Example I—
    I-A (example) _____ 1176
    I-B (example) _____ 1161
    I-R (comparative) _____ 1088
Example II—
    II-A (example) _____ 1168
    II-B (example) _____ 1159
    II-R (comparative) _____ 1013

EXAMPLE III

In this example, the plastic shortening composition comprises (a) 95.5 parts by weight of a blend of partially hydrogenated soybean and cottonseed oils containing 5% substantially completely hydrogenated cottonseed oil and (b) 4.5 parts by weight of a mono-, di-, and triglyceride mixture prepared from a blend of partially hydrogenated soybean and cottonseed oils super-glycerinated to a monoglyceride content of about 40%. This shortening has an S.C.I. of 18.0 at 50° F. and 10.2 at 92° F.

The shortening is heated at 120° F. to the completely liquid condition and is then rapidly chilled in a Votator "A" unit to 50° F. in 12 seconds. The chilled shortening is mildly agitated in a Votator "B" unit where it is allowed to crystallize without heat transfer for about 2 minutes and the temperature rises to about 65° F. The shortening is then held at about 85° F. for 48 hours in a tempering step. After tempering, 12% by volume nitrogen is injected into the plastic shortening by feeding it as 20 p.s.i.g. into the inlet of a gear pump. The aerated plastic shortening is passed through a throttling valve to uniformly disperse the nitrogen and is then packed in conventional containers.

What is claimed is:

1. Process for producing aerated plastic shortening, which comprises:

rapidly chilling liquid fat to a temperature of less than about 80° F. in a time less than about 1 minutes;

mildly agitating the chilled fat in a first crystallizing zone where the fat is allowed to crystallize without heat transfer for a period of from about 30 seconds to about 10 minutes to cause the temperature of the fat to rise;

holding the fat in a second crystallizing zone for a period of at least about 12 hours while maintaining the temperature substantially constant at the temperature to which the fat rises during crystallization; and injecting an innocuous gas into the fat.

2. Process of claim 1 wherein from about 5% to 50% by volume of gas is injected.

3. Process of claim 2 wherein the fat is chilled to a temperature in the range of from about 50° F. to about 70° F.

4. Process of claim 3 wherein the fat is mildly agitated in the first crystallization zone for a period of from about 1 minute to about 4 minutes and the temperature rises by from about 5° F. to about 25° F.

5. Process of claim 4 wherein the fat is held in the second crystallizing zone for a period of from about 12 to about 48 hours at a temperature maintained at from about 70° F. to about 90° F.

6. Process of claim 5 wherein from about 10% to 25% gas is injected.

7. Process of claim 6 wherein the fat is rapidly chilled in less than about 30 seconds.

8. Process of claim 7 wherein the temperature rises in the first crystallizing zone by from about 15°F. to about 20° F.

References Cited

UNITED STATES PATENTS

| | | | |
|---|---|---|---|
| 2,101,496 | 12/1937 | Godfrey et al. | 99—122 |
| 2,174,364 | 9/1939 | Godfrey et al. | 99—122 |
| 2,223,724 | 12/1940 | Godfrey et al. | 99—122 |
| 2,853,390 | 9/1958 | McGowan et al. | 99—122 |
| 3,095,305 | 6/1963 | Kearns | 99—118 |

OTHER REFERENCES

Awern, "Bailey's Industrial Oil and Fat Products," Third Ed., 1964, Interscience Publishers, New York, pages 1064 to 1068.

JOSEPH M. GOLIAN, Primary Examiner